United States Patent [19]

Tawfik et al.

[11] 4,155,116

[45] May 15, 1979

[54] DIGITAL CONTROL SYSTEM INCLUDING BUILT IN TEST EQUIPMENT

[75] Inventors: David A. Tawfik, Ft. Lee; Robert Bollard, Wayne; Donald J. Porawski, Cedar Grove, all of N.J.

[73] Assignee: The Bendix Corporation, Teterboro, N.J.

[21] Appl. No.: 866,886

[22] Filed: Jan. 4, 1978

[51] Int. Cl.² .............................................. G06F 15/20
[52] U.S. Cl. .................................... 364/119; 235/302; 244/194; 364/424; 364/579
[58] Field of Search ............... 364/119, 579, 424, 443, 364/600, 602, 481; 235/301, 302; 244/194

[56] References Cited

U.S. PATENT DOCUMENTS

| 3,275,810 | 9/1966 | Moses et al. ..................... 364/119 X |
| 3,659,087 | 4/1972 | Green et al. ................ 324/73 AT X |
| 3,829,842 | 8/1974 | Langdon et al. ................ 364/119 X |
| 3,976,940 | 8/1976 | Chau et al. ......................... 324/73 R |
| 4,055,801 | 10/1977 | Pike et al. ........................ 324/73 R |

Primary Examiner—Joseph F. Ruggiero
Attorney, Agent, or Firm—Anthony F. Cuoco

[57] ABSTRACT

A digital control system features built in test equipment including analog input signal and discrete input signal wrap around implementations for testing the system to achieve maintainability goals without significantly adding to system configuration requirements.

11 Claims, 3 Drawing Figures

DIGITAL CONTROL SYSTEM INCLUDING BUILT IN TEST EQUIPMENT

BACKGROUND OF THE INVENTION

1. Field of the Invention

This invention relates to digital control systems and particularly to digital control systems having a thorough built in test equipment capability.

2. Description of the Prior Art

Digital control systems include processing units and analog and discrete input and output signal channels associated therewith. It is desirable that built in test equipment (BITE) be provided for testing the systems. When the systems are used for aircraft control purposes, the BITE should particularly provide simple and economical means for testing system line replacement units (LRU's) as is necessary for maintaining Federal Aviation Administration (FAA) Certification and such other certification as may be required.

Prior to the present invention, BITE for accomplishing the aforenoted purposes required that the flow of the system input signals be interrupted to accomplish the required testing. This affects the integrity of the testing and hence is a detriment to maintaining the aforenoted certification. The system of the present invention accomplishes the required testing without interrupting the signal flow and is thus a distinct improvement over like systems now known in the art.

SUMMARY OF THE INVENTION

This invention contemplates a digital control system including built in test equipment (BITE), wherein the system processing unit is responsive to the analog and discrete input signals for generating test signals which are combined with the iput signals in wrap around implementations for testing the system. Significantly, the disclosed implementations permit the aforenoted testing without interrupting the input signal flow, as has otherwise been the case, to provide a more reliable and simplified BITE arrangement than as heretofore been known in the art.

One object of this invention is to provide a digital control system including built in test equipment (BITE) for testing the system to achieve significant maintainability goals without significantly adding to system configuration requirements.

Another object of this invention is to provide the BITE by rendering the processing unit responsive to the analog and discrete system input signals for generating test signals which are combined with appropriate input signals to provide wrap around implementations for testing the system.

Another object of this invention is to accomplish the aforenoted without interrupting the input signal flow.

Another object of this invention is to provide a digital control system of the type which may be used for flight control purposes and including BITE which permits simplified testing of system line replacement units to maintain certification requirements.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

DESCRIPTION OF THE INVENTION

Figure 1:
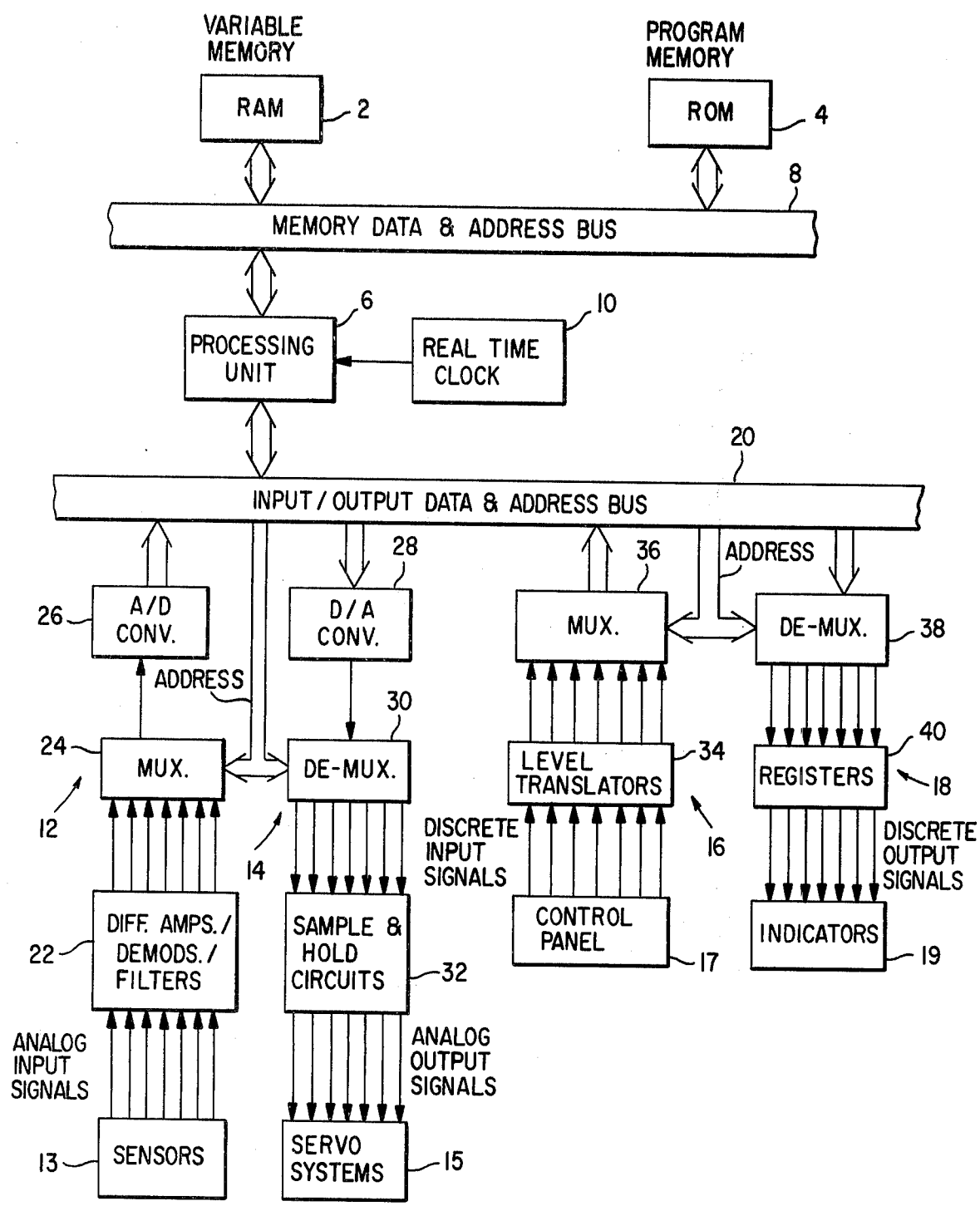
FIG. 1 is a block diagram showing a digital control system of the type which may utilize the BITE implementations of the invention.

With reference to FIG. 1, a typical digital control system is shown as including a random access memory device (RAM) 2 and a read only memory device (ROM) 4. RAM 2 applies a variable memory and ROM 4 applies a program memory to a processing unit 6 through a memory data and address bus 8. A real time clock 10 provides a signal which is applied to processing unit 6 for determining the rate of computation sampling in the digital control system.

An analog input signal channel designated generally by the number 12, an analog output signal channel designated generally by the numeral 14, a discrete input signal channel designated generally by the numeral 16, and a discrete output signal channel designated generally by the numeral 18 are connected to processing unit 6 through an input/output data and address bus 20.

Analog input signal channel 12 receives a plurality of analog input signals from sensors 13 which may be, for purposes of illustration, gyros or other flight condition sensors included in a digital flight control system. The analog signals are applied to corresponding differential amplifiers/demodulators/filters designated generally by the numeral 22 and applied therefrom to a multiplexer 24. Multiplexer 24 provides a signal which is applied to an analog to digital converter 26 and therefrom to processing unit 6 through input/output data and address bus 20.

Analog output signal channel 14 includes a digital to analog converter 28 connected to processing unit 6 through bus 20 for providing an analog signal which is applied to a demultiplexer 30. Demultiplexer 30 provides a plurality of signals which are applied to corresponding sample and hold circuits designated generally by the numeral 32 for providing a plurality of analog output signals. The analog output signals are applied, for purposes of illustration, to servo systems or the like designated generally by the numeral 15 for displacing the control surfaces of an aircraft.

Discrete input signal channel 16 receives a plurality of discrete input signals which are generated by an operator — operated system control panel 17. For purposes of illustration, these signals may be validity signals, i.e., logic "high" or logic "low", corresponding to the analog signals provided by sensors 13. The discrete input signals are applied to corresponding level translators designated generally by the numeral 34 and therefrom to a multiplexer 36 connected to processing unit 6 through input/output data and address bus 20.

Discrete output channel 18 includes a demultiplexer 38 connected to processing unit 6 through bus 20. Demultiplexer 38 provides a plurality of signals which are applied to corresponding registers designated generally by the numeral 40 for providing a corresponding plurality of discrete output signals which drive indicators or the like designated generally by the numeral 19 for indicating the validity or invalidity of the analog input signals, as the case may be.

As heretofore noted, the digital control system described with reference to FIG. 1, is of the type known in the art such as used for flight control purposes, and only as much of the system as is necessary to describe the BITE feature of the invention including analog input signal and discrete input signal wrap around implementations has been illustrated and described.

Figure 2:
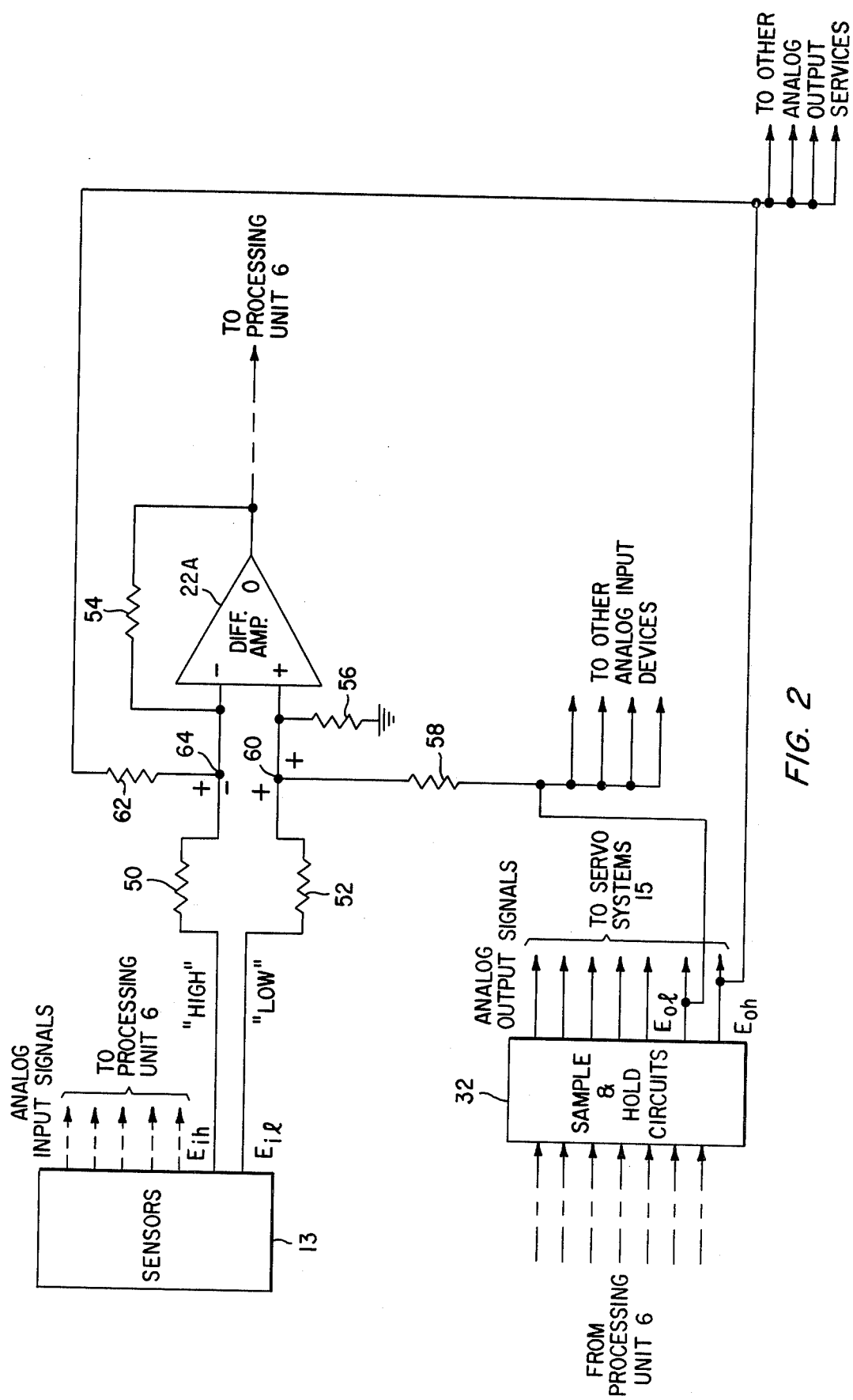
FIG. 2 is a block diagram showing an embodiment of the invention using an analog input signal wrap around BITE implementation in accordance with the invention.

With reference now to FIG. 2, which illustrates the aforenoted analog input signal wrap around implementation, the analog input signals provided by sensors 13 are applied to processing unit 6 as shown generally in FIG. 1. For purposes of illustrating the invention, two of the analog input signals which may represent "high" and "low" signal levels are particularly shown as directed through a BITE implementation to processing unit 6. It will be understood that the other input signals may be directed through like implementations to accomplish the purposes of the invention.

Thus, an analog input signal designated as $E_{ih}$ (high) and an analog input signal designated as $E_{il}$ (low) are applied through resistors 50 and 52 to the inverting input terminal ($-$) and to the noninverting input terminal ($+$), respectively, of a particular differential amplifier 22A included in analog input signal channel 12 shown generally in FIG. 1. A feedback resistor 54 is connected to the output terminal (0) of differential amplifier 22A and is connected to the inverting input terminal ($-$) thereof. Noninverting input terminal ($+$) of differential amplifier 22A is connected to ground through a resistor 56.

The output signal from differential amplifier 22A is directed to processing unit 6 through analog input signal channel 12 and is directed from processing unit 6 through analog output signal channel 16 to sample and hold circuits 32 as shown in FIG. 1 and generally described with reference thereto. The sample and hold circuits provide a plurality of analog output signals which are applied to servo systems 15 (FIG. 1). One of the sample and hold circuits provides an analog output signal $E_{oh}$ corresponding to analog output signal $E_{ih}$ and another of the sample and hold circuits provides an analog output signal $E_{ol}$ corresponding to analog output signal $E_{il}$.

Signal $E_{ol}$ is applied through a resistor 58 to a circuit summing point 60 where it is algebraically summed with signal $E_{il}$ applied through resistor 52, and signal $E_{oh}$ is applied through a resistor 62 to a circuit summing 64 where it is algebraically summed with signal $E_{ih}$ applied through resistor 50.

In this connection it is noted that signals $E_{oh}$ and $E_{ol}$ may be applied to other analog input devices for other purposes as will be understood by those skilled in the art.

Thus it will be seen that in addition to analog input signals $E_{ih}$ and $E_{il}$, test signals generated by processing unit 6 and designated as $E_{oh}$ and $E_{ol}$ are inserted in the input signal channel via the ($-$) and ($+$) input terminals of differential amplifier 22A.

In summary, then, for each of the input signal channels, one of which is illustrated in FIG. 2, the output signal provided by the differential amplifier is inputted to the processor which is arranged for providing test signals through the sample and hold circuits for summing with the input signals. The summed signals are applied to the appropriate ($+$) or ($-$) input terminals of the operational amplifier. The configuration wherein the summed signal at summing point 64 is applied to the ($-$) input terminal of amplifier 22A yields gain characteristics independent of the impedance state of the input signal path which is indeterminate during system test as the appropriate input sensor could have its power off, could be out of its test rack, or could have its connecting pin open as will be understood by those skilled in the art. The resulting input plus test signal is then inputted to the processing unit which is arranged to check the signal against its expected value and to provide an indication of the check as will be understood by those skilled in the art.

In view of the foregoing description of the invention with reference to FIG. 2, it will be understood that the wrap around implementation disclosed tests the appropriate input signal channel differential amplifier and its feedback resistor, the appropriate input signal channel filters and demodulators (shown generally in FIG. 1), multiplexer 24, analog to digital converter 26, digital to analog converter 28 and the data memory access configuration of the invention (as illustrated in FIG. 1).

In a like manner the summed signal at summing point 60 is applied to the ($+$) input terminal of differential amplifier 22A as illustrated in FIG. 2 and generated as heretofore described. This configuration yields gain characteristics dependent on the resistor network of the differential amplifier and dependent on the requirement for low impedance input sensors 13. It will be seen that this implementation tests all the resistors in the differential amplifier implementation, tests for open sensor wires and for large sensor impedance changes. In particular, the open wire detection feature is significant in that it provides a simple and economical way of testing sensor LRU's as these units are replaced in the flight control system herein described.

Figure 3:
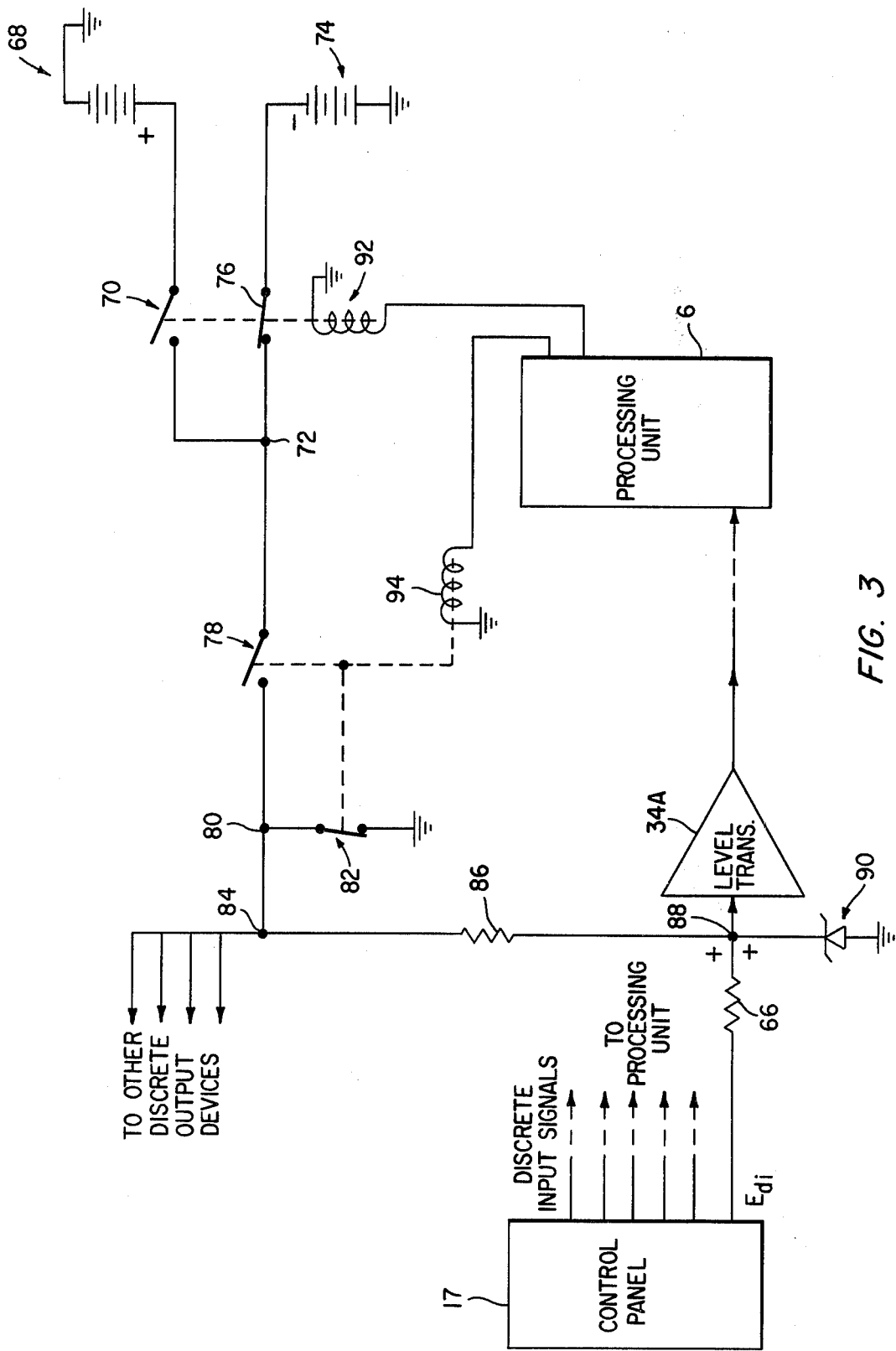
FIG. 3 is a block diagram showing an embodiment of the invention using a discrete input signal wrap around BITE implementation in accordance with the invention.

With reference now to FIG. 3, control panel 17 provides discrete input signals which are applied to processing unit 6 through discrete input channel 16 as shown generally in FIG. 1. One of these signals, designated as $E_{di}$, is shown as being applied through a resistor 66 to its corresponding level translator 34A and therefrom to processing unit 6 as shown generally in FIG. 1. It will be understood that the other discrete input signals may be likewise applied to processing unit 6 through their corresponding channels, with only one discrete input channel being described herein for purposes of illustration.

A source of positive DC voltage shown as a battery 68 is connected through a normally open switch 70 to a circuit point 72 and a source of negative DC voltage shown as a battery 74 is connected through a normally closed switch 76 to circuit point 72. Circuit point 72 is connected through a normally open switch 78 to a circuit point 80 which is grounded through a normally closed switch 82. Circuit point 80 is connected to a circuit point 84 at which a discrete signal is provided. The discrete signal is applied through a resistor 86 to a summing point 88 intermediate resistor 66 and level translator 34A and summed thereat with signal $E_{di}$ applied through resistor 66. A signnal suppressing Zener diode 90 is connected to circuit point 88 and is connected to ground. The discrete signal at circuit point 84 may be applied to other discrete output devices as will be understood by those skilled in the art.

Thus, with continued referenced to FIG. 3, processing unit 6 is arranged to respond to the output of level translator 34A by generating one signal which actuates a relay 92 for closing switch 70 and opening switch 76, and generating another signal which actuates a relay 94 for closing switch 78 and opening switch 82. The processing unit thus has the capability to combine either the positive or negative voltages from batteries 68 and 74, respectively, with the inputs to the translator to force the translator output to "high" or "low" logic levels.

During test a sequence is implemented wherein processing unit 6 samples the existing input state of the translator, looking for expected logic levels as these inputs represent sensor analog input signal validity as heretofore noted. By appropriate operation of switches 70, 76, 78 and 82, the processor forces the translator to a "low" logic state and then checks that those translator inputs which were "high" are now "low". The processor then forces the translator to a "high" logic state and checks that those translator inputs which were "low" are now "high". In this connection it is noted that the above tests are performed very fast so as not to allow the input signals sufficient time to change state.

It will thus be seen from the aforenoted description of the invention with reference to FIGS. 1, 2 and 3 that a digital control system including a very thorough BITE capability has been implemented. The analog input signal and discrete input signal wrap around implementations as disclosed achieve significant system maintainability goals with little addition to existing system configuration requirements, and thus the invention represents a distinct advancement over previous BITE implementations for the purposes intended.

Although several embodiments of the invention have been illustrated and described in detail, it is to be expressly understood that the invention is not limited thereto. Various changes may also be made in the design and arrangement of the parts without departing from the spirit and scope of the invention as the same will not be understood by those skilled in the art.

What is claimed is:

1. A digital control system comprising:
    a processing unit;
    a signal source providing data input signals;
    means including signal combining means connected to said signal source and to said processing unit for applying said data signals from said signal source to said processing unit;
    said processing unit being responsive to said data signals for providing test signals; and
    means for applying said test signals to said combining means;
    said means for applying said data signals from said signal source to said processing unit combining said data and said test signals and applying the combined signals to the processing unit for uninterrupted flow of said data signals, with the processing unit responsive to said combined signals for determining system failure conditions.

2. A system as described by claim 1, wherein:
    said signal source providing data input signals provides at least two analog signals, with one of said analog signals being at a first logic level and the other of said analog signals being at a second logic level.

3. A system as described by claim 2, wherein said combining means included in said means for applying said data signals from said signal source to said processing unit comprises:
    at least one differential amplifier means having an inverting input terminal, a non-inverting input terminal and an output terminal;
    the inverting iput terminal connected to said signal source and receiving said one analog input signal at said first logic level and the non-inverting input terminal connected to said signal source for receiving said other analog input signal at said second logic level, and a differential signal being provided at said output terminal; and
    means connected to said output terminal and to said processing unit for applying said differential signal to said processing unit.

4. A system as described by claim 3, wherein said differential signal constitutes said data signal to which said processing unit responds to provide test signals, said test signals comprising:
    at least two test signals, with one of said test signals being an analog output signal corresponding to said one analog input signal and the other of said test signals being an analog output signal corresponding to said other analog input signal.

5. A system as described by claim 4, wherein said combining means includes:
    first summing means connected intermediate said signal source and said inverting input terminal of said differential amplifier;
    second summing means connected intermediate said signal source and said non-inverting input terminal of said differential amplifier;
    said first summing means summing said one analog input signal with said one test signal for providing a first summed signal, and said second summing means summing said other analog input signal with said other test signal for providing a second summed signal; and
    said inverting input terminal connected to said first summing means for receiving said first summed signal and said non-inverting input terminal connected to said second summing means for receiving said second summed signal, and a differential summed signal being provided at said output terminal of said differential amplifier, said differential summed signal being said combined signals including said data signals applied to said processor.

6. A system as described by claim 5, wherein said processing unit responds to the combined signals for determining system failure conditions by checking said differential summed signal against an expected signal value.

7. A system as described by claim 1, wherein:
    said signal source for providing data input signals provides at least one discrete input signal.

8. A system as described by claim 7, wherein said means including signal combining means includes:
    at least one signal level translator means for translating the level of said discrete data input signal; and
    means connected to said signal level translator means and to said processing unit for applying the translated discrete data input signal to the processing unit.

9. A system as described by claim 8 wherein, said processing unit provides first and second actuating signals in response to said applied discrete data signal and including:

a first voltage source for providing a voltage in one sense;

a second voltage source for providing a voltage in the opposite sense; and switching means connected to the first and second voltage sources and actuated by said first and second actuating signals for switching said voltage in the one sense to provide a first test signal and for switching said voltage in the opposite sense to provide a second test signal.

10. A system as described by claim 9 wherein said means for combining said discrete data input signals and said test signals includes:

summing means connected intermediate said signal source and said signal level translator means and connected to said switching means for summing one of said test signals and said discrete data input signal, with said level translator means being responsive to the summed signal for providing a translated summed signal.

11. A system as described by claim 10, wherein said switching means applies said first test signal to said summing means to provide a first translated summed signal and applies said second test signal to said summing means to provide a second translated summed signal, said first translated summed signal checking the logic state of said level translator means in one sense, said second translated summed signal checking the logic state of said level translator means in an opposite sense.

* * * * *